Patented Dec. 30, 1941

2,267,778

UNITED STATES PATENT OFFICE 2,267,778

STABILIZED VINYL RESIN

Victor Yngve, Lakewood, Ohio, assignor to Carbide and Carbon Chemical Corporation, a corporation of New York No Drawing. Application June 23, 1938, Serial No. 215,412

9 Claims. (Cl. 260—86)

The invention relates to stabilized vinyl resins and compositions containing the same. It is particularly concerned with new and improved stabilizing materials which show definite advantages in preventing deterioration of vinyl resins at elevated temperatures.

As synthetic resinous bodies vinyl resins are well known in the art, and their valuable properties as components of plastic compositions of various sorts have been recognized. In the compounding and processing of such resins into molded and extruded articles, or as constituents of certain coating compositions it is usually necessary to subject the plastics to certain degrees of heat. Under such conditions, as well as at elevated temperatures which may be encountered in normal usage, a tendency toward deterioration is quite commonly encountered. To prevent decomposition in this respect it has, therefore, been considered essential with known types of vinyl resin to incorporate therewith additive materials adapted to exert a stabilizing action, and numerous compounds have been suggested for this purpose.

Improvements afforded by this invention are especially applicable to vinyl resins of the type produced by the more or less complete polymerization of a vinyl halide, such as vinyl chloride, or by the conjoint polymerization of mixtures of vinyl halides with vinyl esters of aliphatic acids. Resins of the latter type are described in U. S. Patent 1,935,577 to E. W. Reid, and among these, the conjointly polymerized product of vinyl chloride and vinyl acetate containing about 60% to 95% of vinyl chloride in the polymer, and having an average molecular weight of from about 5,000 to 20,000, as estimated from the specific viscosity of dilute solutions according to Staudinger's method, is especially susceptible to stabilization by the compounds hereinafter described.

In accordance with my invention I have found that organo-metallic compounds of lead, particularly the higher fatty acid salts of both alkyl and aryl derivatives of this metal, will function as excellent stabilizers for vinyl resins, and when intimately dispersed therein will provide plastic compositions of substantially improved resistance to heat deterioration. A particular advantage in these compounds, other than their actual stabilizing function, also resides in their lubricating qualities and in the fact that resin compositions incorporating them show practically no tendency toward discoloration in the presence of hydrogen sulfide, thereby presenting an especially valuable application of the materials in vinyl resin plastics which may be contacted with sulfur compounds.

A quite broad class of these alkyl and aryl lead fatty acid salts have shown a very satisfactory stabilizing action. Preferably the fatty acid radical in the salt composition is one containing more than eight carbon atoms, as formed by a reaction with a saturated acid, such as stearic, palmitic or lauric acids, or an unsaturated acid, as represented by oleic, linoleic, ricinoleic and undecylenic acids. Among the compounds having an alkyl group those are especially preferred which contain in the alkyl radical three or more carbon atoms, as included in the propyl, isopropyl, butyl, isobutyl, tertiary butyl, the various amyl groups, and the like. As aryl derivatives those containing phenyl, tolyl, xylyl and naphthyl groups are typical. A mixed hydrocarbon grouping in the compound is also appropriate, which may include two or more different alkyl radicals in the molecule or mixed aryl and alkyl groups. Representative specific compounds especially effective in their stabilizing action are the following:

Diphenyl lead stearate
Diphenyl lead oleate
Tributyl lead stearate
Tributyl lead oleate
Tributyl lead ricinoleate
Triphenyl lead stearate
Dibutyl lead undecylenate All of the above and related compounds are intended to be included within the broader scope of the invention, and within the classification which may be defined as organo-metallic lead salts of the higher fatty acids.

Many tests have been made proving the effectiveness of these new stabilizers in plastic compositions. Employing a resin formed by conjoint polymerization of vinyl chloride and vinyl acetate, containing about 87% vinyl chloride in the polymer, and having an average molecular weight of from about 8,000 to 12,000, the stabilizer in quantities of about 1.0% by weight of the resin produces a stable plastic which will remain clear at elevated temperatures employed in subsequent processing, and under heat tests at 135° C. the resistance to deterioration, as evidenced by discoloring or blackening of the resin, is very good. In lacquer compositions the stabilizer may be used in quantities of from about 1% to 5% by weight of the resin. Clear films of the stabilized resin have shown no apparent decomposition when baked on steel panels for thirty minutes at a temperature of 350° F., whereas a film of similar resin, but without the stabilizer, will blacken and decompose entirely in five minutes under the same conditions.

To incorporate the stabilizer within the resin composition, methods heretofore known may be employed which will effect an intimate dispersion thereof throughout the resin mass. The amounts necessary to effect desirable heat stability are also within a range heretofore found suitable with other materials, varying from about 0.5% to about 5.0% by weight of the vinyl resin. In the compounding of plastic compositions for various uses, there may be included any of the common solvents, plasticizers, pigments, and other modifying materials without detrimental effect upon the heat stability afforded by these new stabilizers.

Modifications within the scope of the appended claims will be evident and are intended to be included within the invention as defined therein. This application contains subject matter in common with and is a continuation-in-part of my copending application Serial No. 118,568, filed December 31, 1936, now Patent 2,219,463. Subject matter once disclosed and claimed in this application is disclosed and now claimed in my continuation-in-part application Serial No. 365,008, filed November 9, 1940.

I claim:

1. A heat-stable resinous composition comprising a vinyl resin substantially identical with that formed by the conjoint polymerization of vinyl chloride and vinyl acetate and containing in the polymer about 60% to 95% of vinyl chloride, and a stabilizing material intimately dispersed therein, said stabilizing material comprising about 0.5% to 5.0% by weight of the resin of a diphenyl lead salt of a fatty acid containing 18 carbon atoms.

2. A heat-stable vinyl resin composition including polymerized vinyl halide containing intimately dispersed therein a stabilizing material comprising an organo-metallic lead salt of a fatty acid containing more than eight carbon atoms.

3. A heat-stable vinyl resin composition including polymerized vinyl halide containing intimately dispersed therein a stabilizing material comprising an organo-metallic lead salt, having at least one alkyl group, of a fatty acid containing more than eight carbon atoms.

4. A heat-stable vinyl resin composition including polymerized vinyl halide containing intimately dispersed therein a stabilizing material comprising an organo-metallic lead salt, having at least one aryl group, of a fatty acid containing more than eight carbon atoms.

5. A heat-stable vinyl resin composition including polymerized vinyl halide containing intimately dispersed therein a stabilizing material comprising a dialkyl lead salt of a fatty acid containing more than eight carbon atoms.

6. A heat-stable vinyl resin composition including polymerized vinyl halide containing intimately dispersed therein a stabilizing material comprising a diaryl lead salt of a fatty acid containing more than eight carbon atoms.

7. A heat-stable resinous composition comprising a vinyl resin substantially identical with that resulting from the conjoint polymerization of a vinyl halide with a vinyl ester of an aliphatic acid, and a stabilizing material intimately dispersed therein comprising an organo-metallic lead salt of a fatty acid containing more than eight carbon atoms.

8. A heat-stable resinous composition comprising a vinyl resin substantially identical with that resulting from the conjoint polymerization of a vinyl halide with a vinyl ester of an aliphatic acid, and a stabilizing material intimately dispersed therein comprising an organo-metallic lead salt, having at least one alkyl group, of a fatty acid containing more than eight carbon atoms.

9. A heat-stable resinous composition comprising a vinyl resin substantially identical with that resulting from the conjoint polymerization of a vinyl halide with a vinyl ester of an aliphatic acid, and a stabilizing material intimately dispersed therein comprising an organo-metallic lead salt, having at least one aryl group, of a fatty acid containing more than eight carbon atoms.

VICTOR YNGVE.